US011052269B1

(12) United States Patent
Greenway, II et al.

(10) Patent No.: US 11,052,269 B1
(45) Date of Patent: Jul. 6, 2021

(54) PROTECTIVE FACE MASKS

(71) Applicants: Michael D. Greenway, II, Dewey, AZ (US); Brian J. Fortier, Glen Allen, VA (US); David Thornhill, Salem, VA (US); William T. Bailey, Glen Allen, VA (US)

(72) Inventors: Michael D. Greenway, II, Dewey, AZ (US); Brian J. Fortier, Glen Allen, VA (US); David Thornhill, Salem, VA (US); William T. Bailey, Glen Allen, VA (US)

( * ) Notice: Subject to any disclaimer, the term of this patent is extended or adjusted under 35 U.S.C. 154(b) by 0 days.

(21) Appl. No.: 17/015,869

(22) Filed: Sep. 9, 2020

Related U.S. Application Data

(60) Provisional application No. 63/018,580, filed on May 1, 2020.

(51) Int. Cl.
*A62B 23/02* (2006.01)
*A41D 13/11* (2006.01)
*B32B 5/26* (2006.01)
*B32B 5/02* (2006.01)
*A62B 9/00* (2006.01)

(52) U.S. Cl.
CPC .......... *A62B 23/025* (2013.01); *A41D 13/11* (2013.01); *A41D 13/1161* (2013.01); *A41D 13/1192* (2013.01); *A62B 9/00* (2013.01); *B32B 5/022* (2013.01); *B32B 5/26* (2013.01); *B32B 2250/05* (2013.01); *B32B 2264/108* (2013.01); *Y10T 442/3789* (2015.04); *Y10T 442/3829* (2015.04); *Y10T 442/50* (2015.04); *Y10T 442/54* (2015.04); *Y10T 442/57* (2015.04); *Y10T 442/59* (2015.04); *Y10T 442/68* (2015.04); *Y10T 442/681* (2015.04)

(58) Field of Classification Search
None
See application file for complete search history.

(56) References Cited

U.S. PATENT DOCUMENTS

| 2002/0166811 | A1* | 11/2002 | Walker | B01D 46/0024 210/455 |
| 2009/0211581 | A1* | 8/2009 | Bansal | B32B 5/026 128/206.19 |
| 2012/0082711 | A1* | 4/2012 | Goranov | A01N 59/16 424/404 |

(Continued)

FOREIGN PATENT DOCUMENTS

WO    WO-2011101857 A2 *  8/2011  ............ D06M 11/79

OTHER PUBLICATIONS https://patents.google.com/patent/WO2011101857A2/en?q=%22trihydroxysilane%22+antibacterial&oq=%22trihydroxysilane%22+antibacterial+ (Year: 2010).*

(Continued)

*Primary Examiner* — Arti Singh-Pandey
(74) *Attorney, Agent, or Firm* — Bruce A. Lev

(57) ABSTRACT

An improved protective face mask used to filter out hazardous pollution and airborne germs and viruses. Embodiments include a three layer version including a first spunbond TETHYS SHIELD treated layer, a meltblown filtration layer, and a second spunbond layer; a four layer version further including a gasket layer formed of a felt material; and a five layer version further including an activated carbon layer in between the spunbond TETHYS SHIELD treated layer and the meltblown filtration layer.

24 Claims, 4 Drawing Sheets

(56) References Cited

U.S. PATENT DOCUMENTS

2015/0306432 A1\* 10/2015 Orofino .............. A41D 13/1161
  128/863
2016/0015098 A1\* 1/2016 Conlon .............. A41D 13/1192
  128/863

OTHER PUBLICATIONS https://patents.google.com/patent/CN111165935A/en?q=Activated+Carbon+Felt+AND+mask&oq=Activated+Carbon+Felt+AND+mask (Year: 2018).\*

\* cited by examiner

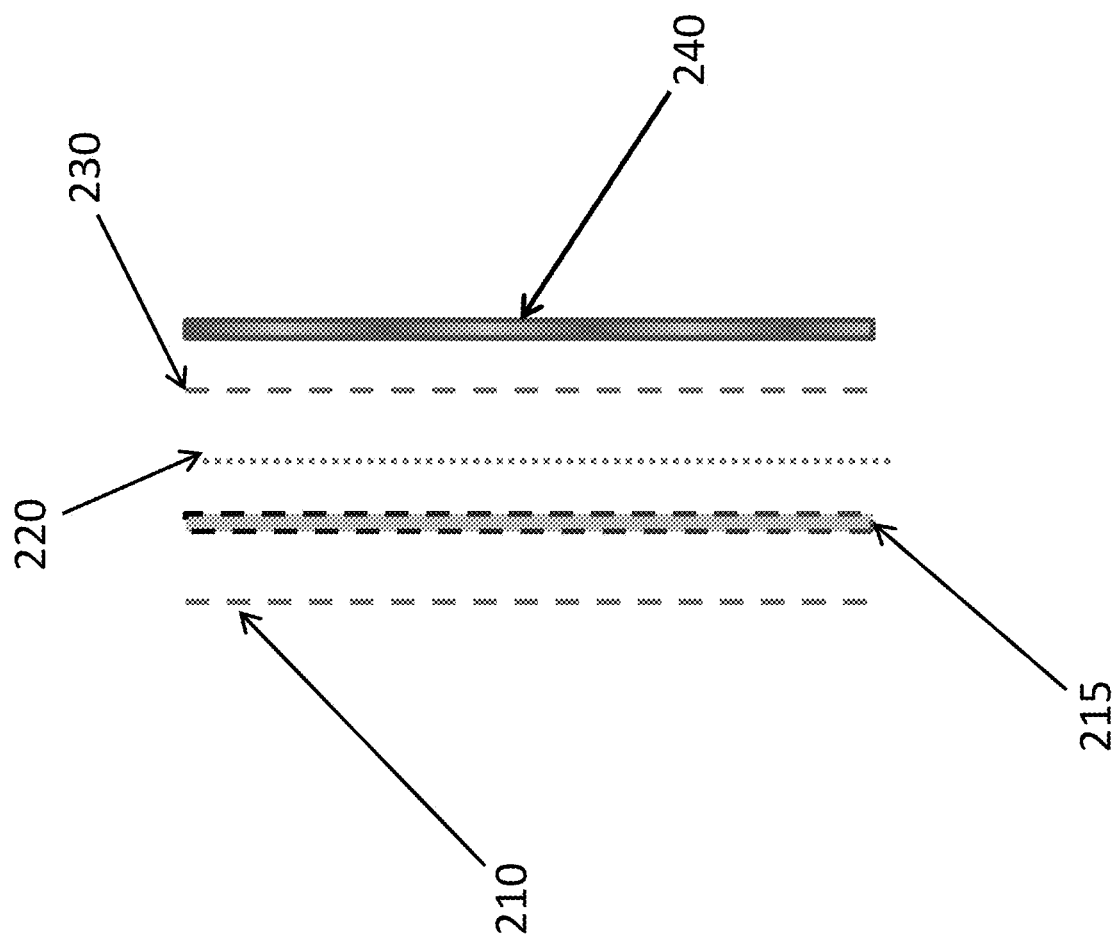

PROTECTIVE FACE MASKS

CROSS-REFERENCE TO RELATED APPLICATION

The present application is related to and claims priority from prior provisional application Ser. No. 63/018,580, filed May 1, 2020 which is incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR 1.71(d).

BACKGROUND OF THE INVENTION

1. Field of the Invention

The present invention relates generally to the field of protective face masks and more specifically relates to protective face masks used to filter air from hazardous pollution and airborne germs and viruses.

2. Description of the Related Art

Previous protective face masks mostly consist of one or more layers of cotton and plastic fibers that filter out particles of specific sizes and are not designed or efficient at filtering out airborne germs or viruses.

The most current and effective protective face mask is the N95™ respirator, which filters at least 95 percent of airborne particles and incorporates polypropylene non-woven fibers. However, these masks do not filter out all airborne particles nor filter out all airborne germs or viruses. Thus, a need exists for improved protective face masks that can filter out all hazardous pollution and airborne germs and viruses that might cause harm to a person.

BRIEF SUMMARY OF THE INVENTION

In view of the foregoing disadvantages inherent in the previous protective face mask technologies, the present invention provides protective face masks that include extra layers of filtering materials designed to filter out hazardous pollution and airborne germs and viruses that the previous protective face masks do not.

The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments for the present invention, Improved Protective Face Masks, constructed and operative according to the teachings of the present invention.

FIG. 5 shows a side view of the improved protective face mask incorporating a fifth layer including activated carbon according to the preferred embodiment shown in FIG. 2.

Figure 1C:
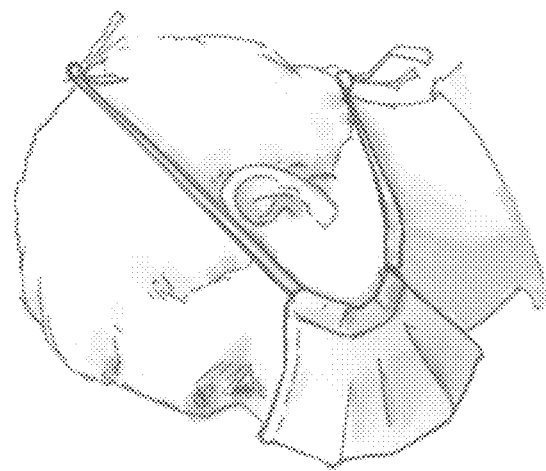
FIG. 1a-1d show various strap configurations associated with embodiments of the present invention.
Figure 1B:
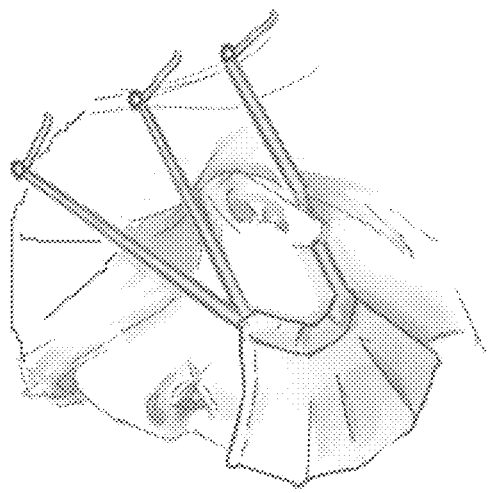
Figure 1A:
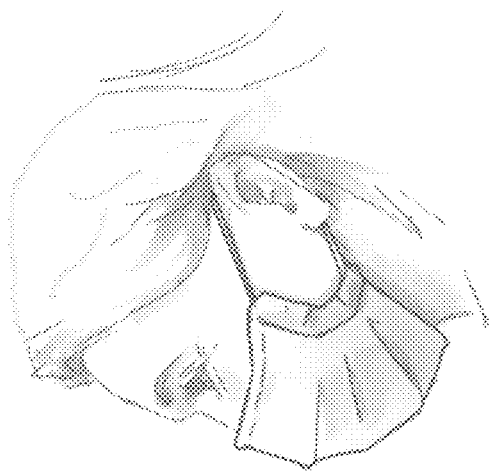
Figure 1D:
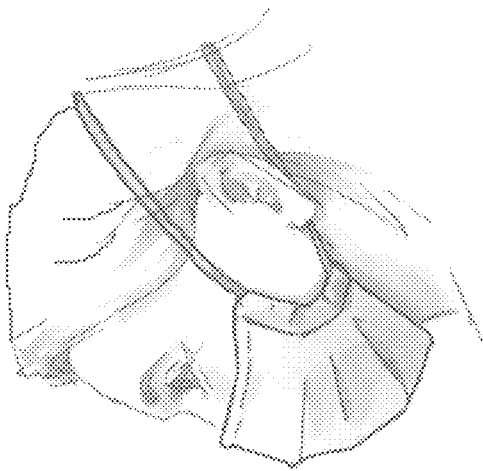

The various embodiments of the present invention will hereinafter be described in conjunction with the appended drawings.

DETAILED DESCRIPTION

As discussed above, embodiments of the present invention relate to protective face masks used to filter air from hazardous pollution and airborne germs and viruses.

The protective face masks of the instant invention are made of materials including spunbond, meltblown, and activated carbon. The main uses of melt-blown nonwovens and other innovative approaches are as follows. During filtration, nonwoven melt-blown fabrics are porous. As a result, they can filter liquids and gases. Their applications include water treatment, masks, and air-conditioning filters. Sorbents are nonwoven materials that can retain liquids several times their own weight. Thus, those made form polypropylene are ideal for collecting oil contamination. In prior uses the high absorption of melt-blown fabrics was used in disposable diapers and feminine hygiene products. Melt-blown fabrics have three qualities that help make them useful for clothing in harsh environments, including thermal insulation, moisture resistance, and breath-ability.

Some of the advancements over the prior art include adding a carbon/charcoal filter and a polyester gasket. Furthermore, a spunbond layer treated with a TETHYS SHIELD™ antimicrobial compound, which includes a citric acid, and a mix of ammonium chloride and water, is incorporated on the front/face of the masks.

The improved protective face mask may include a three layer version including a first spunbond TETHYS SHIELD™ treated layer, a meltblown filtration layer, and a second spunbond layer; a four layer version further including a gasket layer formed of a felt material; and a five layer version further including an activated carbon layer in between the spunbond TETHYS SHIELD™ treated layer and the meltblown filtration layer.

The preferred embodiment of the instant invention includes four layers, wherein a 1-ounce spunbond treated TETHYS SHIELD™ layer, an N95™ meltblown filtration media layer, a 0.45 ounce spunbond layer, and a gasket layer formed of a felt material.

A five filter version of the improved protective face mask includes a1-ounce spunbond treated TETHYS SHIELD™ layer, an N95™ meltblown filtration media layer, a 0.45 ounce spunbond layer, a gasket layer formed of a felt material, and an activated carbon cloth/felt layer in between the 1-ounce spunbond treated TETHYS SHIELD™ layer and the N95™ meltblown filtration media layer.

One of the problems facing present filtering face masks is providing a proper fit to a wide variety of individual wearers such than an airtight seal is maintained about the periphery of the mask, forcing all inhaled air to travel through the filter.

In one aspect of the invention, the mask includes a filter body comprising a non-woven filtering substrate, which can be formed from a felt material, configured to cover the mouth and nose of a user when the mask is worn, and a compressible non-woven gasket comprising a high loft, porous dielectric filtering material positioned along a periphery of the mask that abuts the user's face when the mask is worn, thereby forming a breathable closure without forming an airtight or even a substantially airtight seal between the skin and the ask, such that the user can easily draw breathable air from the sides, top, and bottom of the mask when the mask is worn.

The mask is preferably made up of a plurality of stacked layers having the same or substantially equivalent outer dimensions, where the filter body and compressible gasket are four of the stacked layers. The mask is preferably a respirator (ie, a N95™, 99, or 100 respirator), however, in certain embodiments the mask can be a face shield, a face mask, a surgical mask, a filter mask, a mouth mask, or a gas mask.

The filtering material of the compressible gasket has a high loft and provides a 3D porous structure to sufficiently filter air that is drawn in from a 1 micron at the top, bottom, and sides of the mask when in use. The gasket is designed to not cover the mouth and nostrils of the wearer, thereby providing enhanced comfort due to lower inhalation and exhalation resistance, yet the gasket has a high enough loft and the air path therethrough is convoluted and long enough to cause air drawn in from the top, bottom, and sides of the mask to be effectively filtered before being inhaled by the user. The compressible gasket has a desired thickness of at least 2.0 mm, and more preferably about 2.5 mm.

Another configuration of the improved protective face mask may include an adjustable nosepiece and an adjustable chin piece. In the preferred embodiment only an adjustable nosepiece is used.

Spunbond nonwovens are made in one continuous process. Fibers are spun and then directly dispersed into a web by deflectors or can be directed with air streams. This technique leads to faster belt speeds, and cheaper costs. Spunbond fabrics typically have more uniform properties than other structures of nonwoven and are usually made from nylon, polyester, polypropylene. and blends thereof and using different ratios of different filament fibers, PET/PP, PET/PE, PET/PA, and PET/CoPET.

A melt blown face mask filter material is a type of HEPA (high efficiency particulate air) filter formed from a polypropylene filtration material that can be used for PPE (personal protective equipment) masks and respirators.

The antimicrobial treatment applied to the 1-ounce spunbond layer may be formed as a liquid citric acid solution including 97-99% citric acid and 1-3% water. The TETHYS SHIELD™ may also be formed as mixture of water and ORGANOTRIHYDROXYSILANE. In a preferred embodiment the TETHYS SHIELD™ is formed from 95% water and 5% ORGANOTRIHYDROXYSILANE. The chemical composition of ORGANOTRIHYDROXYSILANE is $C_2H_{52}ClNO_3Si$.

Furthermore, ORGANOTRIHYDROXYSILANE may also be formed as: 3-(TRIHYDROXYSILYL)PROPYLDIMETHYLOCTADECYL AMMONIUM CHLORIDE OCTADECYLDIMETHYL(3-TRIHYDROXYSILYLPROPYL)AMMONIUM CHLORIDE, 84% active condensed; 3-(TRIHYDROXYSILYL)PROPYLDIMETHYLOCTADECYL AMMONIUMCHLORIDE, 5% AQUEOUS SOLUTION SILSESQUIOXANES; and 3-(DIMETHYLOCTADECYLAMMONIO)PROPYL, HYDROXY-TERMINATED, CHLORIDES.

The activated carbon layer may also be formed from a polyester material that includes a hot pressed adhesive, such as polyesteramide (PEA), has an area weight of 28 g/meter-squared, a width of 1 m, and a length of 95 m/roll.

It has been noted during experimentation that it is harder to breathe through the mask the heavier the spunbond material. For example, a 30 gram spunbond material used in an N95™ mask is easier to breathe through than a 50 gram spunbond material used in an N95™ mask.

During the process of making the instant invention a specifically shaped wheel is used to press and connect the layers together on their respective edges. This wheel improves the respective connections in comparison to the prior art methods of making similar masks. Other processes are also used including sonic welding seams 150 and sewing seams 160.

Referring now to FIGS. 1a-1d, various strap configurations are disclosed, including a two ear-loop configuration 1a, a three strap configuration 1b, a two strap configuration 1c, and an elastic head strap configuration 1d.

Figure 2:
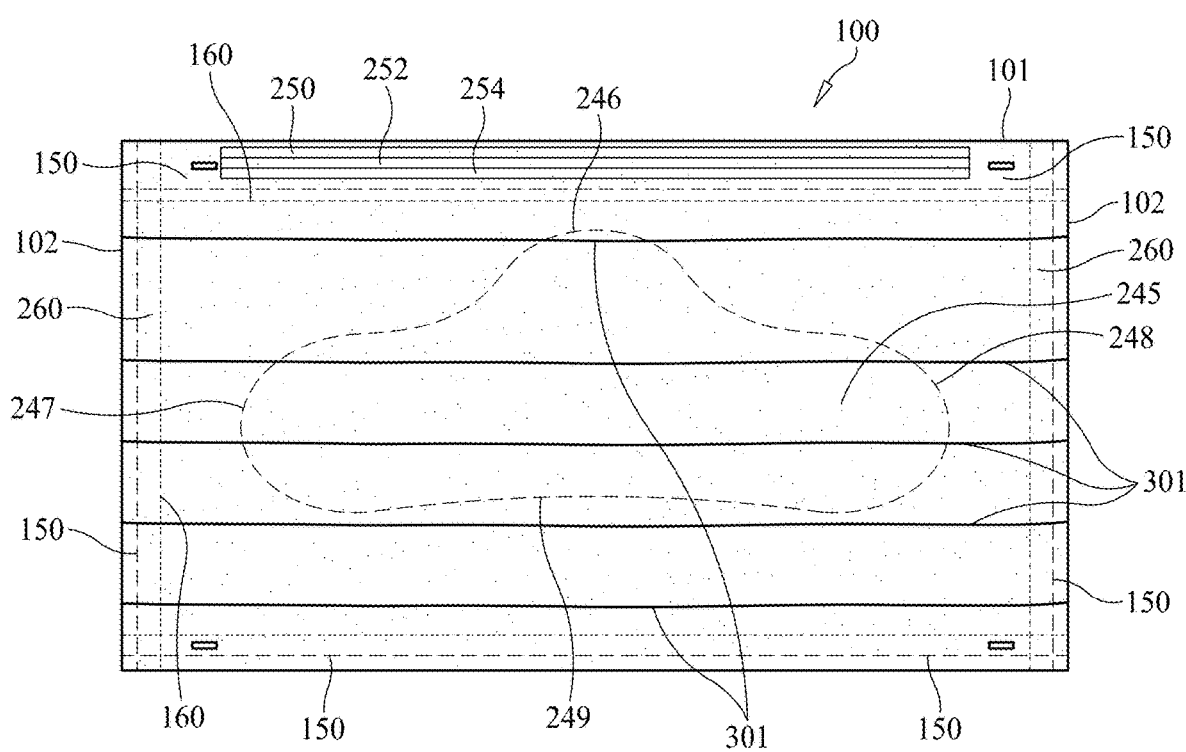
FIG. 2 shows a front view of the improved protective face mask incorporating four layers according to the preferred embodiment of the present invention.

FIG. 2 shows a front view of the improved protective face mask including sonic weld lines 150, gasket sew lines 160, and folds and pleats 150.

Figure 3:
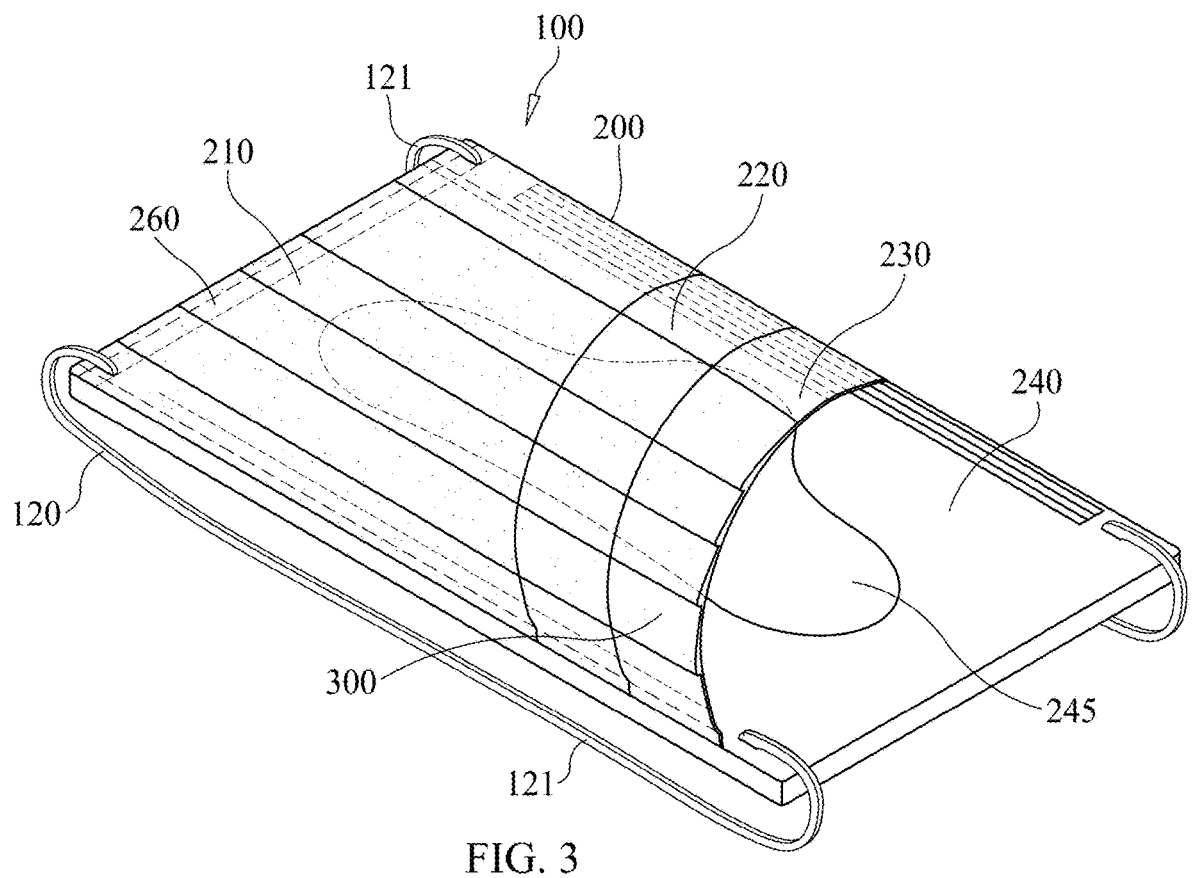
FIG. 3 shows a perspective cut-away view of the improved protective face mask incorporating four layers according to the preferred embodiment shown in FIG. 2.

FIG. 3 shows a perspective view of the improved protective face mask 100, also known as a respiratory face mask.

Figure 4:
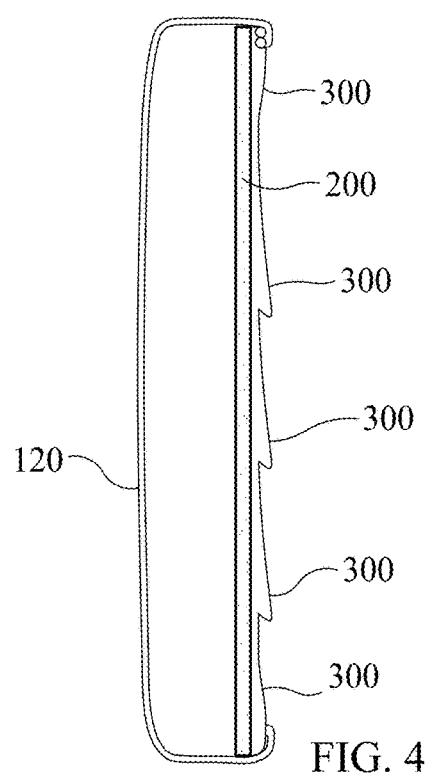
FIG. 4 shows a side view of the improved protective face mask incorporating four layers according to the preferred embodiment shown in FIG. 2.

FIG. 4 shows a side view of the improved protective face mask 100 incorporating pleats 300 that help expand and contract the face mask to conform to a user's facial structure.

Referring now to the preferred embodiment best illustrated in FIGS. 2-4, the improved respiratory face mask 100 comprises a harness 120 including at least one elongated strap 121; and a mask body 200 comprising a first layer 210 formed from a spunbond material, a second layer 220 formed from a melt blown material; and a third layer 230 formed from a spunbond material, wherein the first layer is placed adjacent to the second layer, the second layer is placed adjacent to the third layer, and the first, second, and third layers are interconnected to one another along outer edge portions thereof and wherein opposite end portions of said at least one elongated strap are attached to spaced outer edge portions of said mask body, such that said mask body can be releasably held against said user's face surrounding their nose and mouth and providing filtration of air passing into and out of said user's nose and mouth. This 3-layered version of the preferred embodiment is best suited to be used as a "surgical" mask in hospital settings.

A 4-layered version of the preferred embodiment of the improved respiratory face mask includes a fourth layer 240 formed from a compressible non-woven material and acts as a gasket between the previous three layers and a user's face and contacts area around the user's nose and mouth. As such, the fourth layer includes an aperture 245 therethrough formed having a shape adapted to allow a user's nose and mouth to be placed therethrough. The fourth layer is placed adjacent the third layer and is interconnected to the first, second, and third layers along outer edge portions thereof.

In the preferred embodiment, the first layer 210 may be formed from a 1-ounce spunbond material, and may include citric acid, and a mixture of water and ORGANOTRIHYDROXYSILANE. The second layer 220 may be formed from N95™ meltblown filter material. The third layer 230 may be formed from a 0.45-ounce spunbond material. And the compressible non-woven material of the fourth layer 240 may be formed from a felt material and include activated carbon.

As illustrated in FIG. 5, a fifth layer 215 to the preferred embodiment may be included that is formed from a felt material that includes activated carbon, wherein the fifth layer 215 is placed in between the first layer 210 and the second layer 220. When the fifth layer with carbon is incorporated the third layer 230 is formed from a 0.45-ounce spunbond material.

The respiratory face mask may further include an elongated nose piece 250 comprising at least one elongated bendable wire 252, and an elongated cover 254 encasing the at least one elongated bendable wire. The elongated nose piece is connected to a top edge portion 101 of the mask body 100 and is adapted to bend to the contour of a user's nose to thereby press the mask body against the face of the user. In the preferred embodiment there are two spaced elongated bendable wires 252, wherein the elongated cover encases both of the two spaced elongated bendable wires.

The mask body 100 may further comprise two side panels respectively connected to two opposite side edges of the mask body and to respective opposite end portions of the at least one elongated strap. In one embodiment there are two elongated straps 121 connected to the mask body and are spaced from one another. The elongated straps are stretchable and resilient to thereby accommodate different sized heads of users.

In the preferred embodiment the mask body 100 includes folds 301 forming pleats 300 to thereby be adapted to stretch and conform to the contours of a user's face.

In the preferred embodiment the shape of the aperture of the fourth layer 240 includes a first curved portion 246 adapted to conform along the contour of the bridge of the user's nose; a second curved portion 247 adapted to conform along the contour of a first side of the mouth of the user; a third curved portion 248 adapted to conform along the contour of a second side of the mouth of the user spaced and opposite from said first side of the mouth of the user; and a fourth curved portion 249 adapted to conform along the contour of the user's chin, such that the fourth layer forms a seal around the user's nose and mouth and between the face of the user and the mask body, and is adapted to filter air therethrough.

In the preferred embodiment the elongated nose piece is connected to adjacent top edge portions 101 of the first, second, and third layers, and is spaced from a top edge portion of the fourth layer, to thereby allow the top edge portion of the fourth layer to move with respect to the nose piece and thereby adapting the respiratory face mask to be more comfortable for the user to wear. Furthermore, the nose piece is adapted to bend to the contour of the user's nose to thereby press the mask body against the face of the user.

In the preferred embodiment the mask body 100 may further comprise two side panels 260 respectively connected to two opposite side edges 102 of the mask body and to respective opposite end portions of the at least one elongated strap, wherein the two side panels extend outwardly from the two opposite side edges of the mask body and are adapted to cover edge portions of the felt material of the fourth layer 240 that include activated carbon and that do not contact the face of the user.

In the preferred embodiment the preferred length of the nose piece is about 5 inches in length, which is longer than prior art mask nose pieces that are typically 3½ to 4 inches in length. This length helps keep the mask against the face of the user better than previous masks and form a better seal therebetween. Furthermore, the "double wire" configuration works better than the "single wire" version, which also helps keep the mask against the face of the user better and form an even better seal.

It should be noted that during experimentation it was found that the TETHYS SHIELD™ layer of citric acid and the mixture of water and ORGANOTRIHYDROXYSILANE usually lasts for only five days, therefore a plastic bag is used to store the mask until use. When for sale, ten masks will be placed and stored within one plastic bag. Furthermore, when for sale the TETHYS SHIELD™ layer may be called a TETHYS SHIELD™ which will be trademarked as well.

A further embodiment of the instant invention occurs with meltblown material is unavailable. In such instances, a PET Spunbond 35 g/m2 material; and a nanofibers layer of polymer PVDF 0.6/0.8 g/m2 can be substituted for the meltblown material. The structure of nanofiber media makes them a unique material for fine dust particles, aerosols, bacterias or viruses. Nanofiber based filters provide better filtration performance than conventional meltblown materials with a quite smaller weight per basis area. The main material for nanofiber face masks is Polyvinyl fluoride (PVDF), and can be produced using an electrospinning process.

The following data table discloses the physical and chemical properties of HPMS Activated Carbon Felt, HACF1600 layer used within the preferred embodiment of the instant invention. The activated carbon felt is made of high purity rayon based carbon fiber and contains no resin, no adhesive, and no carbon powder.

| Item | Properties | Unit | Value |
| --- | --- | --- | --- |
| 1 | Specific surface area (BET) | $m^2/g$ | >1600 |
| 2 | Iodine adsorption | mg/g | 1450-1550 |
| 3 | Methylene blue adsorption | mg/g | 250 |
| 4 | Benzene adsorption | % | >53 |
| 5 | Filament diameter | denier | 10-20 |
| 6 | Bulk Density | $g/cm^3$ | .085-.090 |
| 7 | Ignite point | ° C. | >500 |
| 8 | Ash | % | <1.5 |
| 9 | Pore volume | $cm^3/g$ | 1.0 |
| 10 | Average pore diameter | nm | 1.7-2 |
| 11 | pH | | 5.6-7.0 |
| 12 | Thickness | mm | 2-3 |

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed:
1. A respiratory face mask comprising:
 a harness comprising:
  at least one elongated strap; and
 a mask body comprising:
  a first layer formed from a spunbond material;
  a second layer formed from a melt blown material;
  a third layer formed from a spunbond material; and a fourth layer formed from a compressible non-woven material,
  wherein said fourth layer includes an aperture therethrough formed having a shape adapted to allow a user's nose and mouth to be placed therethrough;
  wherein said shape of said aperture of said fourth layer includes:
    a first curved portion:
      wherein said first curved portion is adapted to conform along the contour of the bridge of said user's nose;
    a second curved portion;
      wherein said second curved portion is adapted to conform along the contour of a first side of the mouth of said user;
    a third curved portion;
      wherein said third curved portion is adapted to conform along the contour of a second side of the mouth of said user spaced and opposite from said first side of the mouth of said user; and
    a fourth curved portion;
      wherein said fourth curved portion is adapted to conform along the contour of said user's chin;
  wherein said fourth layer forms a seal around said user's nose and mouth and between the face of said user and said mask body, and is adapted to filter air therethrough;
wherein said first layer is placed adjacent to said second layer; said second layer is placed adjacent to said third layer; and said third layer is placed adjacent to said fourth layer; and
wherein said first, said second, said third, and said fourth layers are interconnected to one another along outer edge portions thereof;
wherein opposite end portions of said at least one elongated strap are attached to spaced outer edge portions of said mask body, such that said mask body can be releasably held against said user's face surrounding their nose and mouth and providing filtration of air passing into and out of said user's nose and mouth.

2. The respiratory face mask of claim 1, wherein said first layer is formed from a 1-ounce spunbond material.

3. The respiratory face mask of claim 1, wherein said first layer includes a mixture of water and organotrihydroxysilane.

4. The respiratory face mask of claim 1, wherein said first layer includes citric acid.

5. The respiratory face mask of claim 1, wherein said first layer includes citric acid and mixture of water and organotrihydroxysilane.

6. The respiratory face mask of claim 1, wherein said second layer is formed from an N95 meltblown filter material.

7. The respiratory face mask of claim 1, wherein said third layer is formed from a 0.45-ounce spunbond material.

8. The respiratory face mask of claim 1, further comprising a fifth layer formed from a felt material including activated carbon; and wherein said fifth layer is placed in between said first layer and said second layer; and wherein said third layer is formed from a 0.45-ounce spunbond material.

9. The respiratory face mask of claim 8, further comprising a fifth layer formed from a felt material including activated carbon; and wherein said fifth layer is placed in between said first layer and said third layer.

10. The respiratory face mask of claim 1, wherein said first layer is formed from a 1-ounce spunbond material treated with a biosafe compound; wherein said second layer is formed from N95 meltblown filter material; wherein said third layer is formed from a 0.45-ounce spunbond material.

11. The respiratory face mask of claim 1, further comprising:
  an elongated nose piece comprising:
    at least one elongated bendable wire; and
    an elongated cover;
      wherein said elongated cover encases said at least one elongated bendable wire;
    wherein said elongated nose piece is connected to a top edge portion of said mask body, and is adapted to bend to the contour of said user's nose to thereby press said mask body against the face of said user.

12. The respiratory face mask of claim 1, wherein said mask body further comprises:
  two side panels;
    wherein said two side panels are respectively connected to two opposite side edges of said mask body and to respective said opposite end portions of said at least one elongated strap.

13. The respiratory face mask of claim 1, wherein there are two elongated straps connected to said mask body and spaced from one another.

14. The respiratory face mask of claim 1, wherein said mask body is pleated to thereby be adapted to stretch to conform to the contours of said user's face.

15. The respiratory face mask of claim 1, wherein said at least one elongated strap is stretchable and resilient to thereby accommodate different sized heads of users.

16. The respiratory face mask of claim 11, wherein there are two spaced elongated bendable wires; and wherein said elongated cover encases both of said two spaced elongated bendable wires.

17. A respiratory face mask comprising:
  a harness comprising:
    at least one elongated strap; and
  a mask body comprising:
    a first layer formed from a spunbond material;
    a second layer formed from a melt blown material;
    a third layer formed from a spunbond material; and
    a fourth layer formed from a compressible non-woven material,
      wherein said fourth layer includes an aperture therethrough formed having a shape adapted to allow a user's nose and mouth to be placed therethrough;
    wherein said first layer is placed adjacent to said second layer; and
    wherein said second layer is placed adjacent to said third layer; and
    wherein said first, said second, and said third layers are interconnected to one another along outer edge portions thereof; and
  an elongated nose piece comprising:
    at least one elongated bendable wire; and
    an elongated cover;
      wherein said elongated cover encases said at least one elongated bendable wire;
    wherein said elongated nose piece is connected to adjacent top edge portions of said first, second, and third layers, and is spaced from a top edge portion of said fourth layer, to thereby allow said top edge portion of said fourth layer to move with respect to said nose piece and thereby adapting said respiratory face mask to be more comfortable for said user to wear; and wherein said nose piece is adapted to bend to the contour of said user's nose to thereby press said mask body against the face of said use;

wherein opposite end portions of said at least one elongated strap are attached to spaced outer edge portions of said mask body, such that said mask body can be releasably held against said user's face surrounding their nose and mouth and providing filtration of air passing into and out of said user's nose and mouth.

18. The respiratory face mask of claim 17, wherein said first layer includes citric acid and mixture of water and organotrihydroxysilane.

19. The respiratory face mask of claim 17, wherein said first layer is formed from a 1-ounce spunbond material treated with a biosafe compound; wherein said second layer is formed from N95 meltblown filter material; and wherein said third layer is formed from a 0.45-ounces spunbond material; and wherein said compressible non-woven material of said fourth layer is formed from a felt material.

20. The respiratory face mask of claim 17, further comprising a fifth layer formed from a felt material including activated carbon; and wherein said fifth layer is placed in between said first layer and said second layer; and wherein said third layer is formed from a 0.45-ounce spunbond material.

21. A respiratory face mask comprising:
a harness comprising:
at least one elongated strap; and
a mask body comprising:
a first layer formed from a spunbond material;
a second layer formed from a melt blown material;
a third layer formed from a spunbond material; and
a fourth layer formed from a compressible non-woven material,
wherein said fourth layer includes an aperture therethrough formed having a shape adapted to allow a user's nose and mouth to be placed therethrough;
wherein said first layer is placed adjacent to said second layer; and
wherein said second layer is placed adjacent to said third layer; and
wherein said first, said second, and said third layers are interconnected to one another along outer edge portions thereof;
wherein said compressible non-woven material of said fourth layer is formed from a felt material;
wherein said third layer is formed from a 0.45-ounce spunbond material;
and wherein said felt material of said fourth layer includes activated carbon; and
two side panels;
wherein said two side panels are respectively connected to two opposite side edges of said mask body and to respective said opposite end portions of said at least one elongated strap; and
wherein said two side panels extend outwardly from said two opposite side edges of said mask body and are adapted to cover edge portions of said felt material of said fourth layer that include activated carbon and that do not contact said face of said user;
wherein opposite end portions of said at least one elongated strap are attached to spaced outer edge portions of said mask body, such that said mask body can be releasably held against said user's face surrounding their nose and mouth and providing filtration of air passing into and out of said user's nose and mouth.

22. The respiratory face mask of claim 21, wherein said first layer includes citric acid and mixture of water and organotrihydroxysilane.

23. The respiratory face mask of claim 21, wherein said first layer is formed from a 1-ounces spunbond material treated with a biosafe compound; wherein said second layer is formed from N95 meltblown filter material; and wherein said third layer is formed from a 0.45-ounce spunbond material; and wherein said compressible non-woven material of said fourth layer is formed from a felt material.

24. The respiratory face mask of claim 21, further comprising a fifth layer formed from a felt material including activated carbon; and wherein said fifth layer is placed in between said first layer and said second layer; and wherein said third layer is formed from a 0.45-ounce spunbond material.

\* \* \* \* \*